United States Patent
Piratla et al.

(10) Patent No.: US 8,893,290 B2
(45) Date of Patent: Nov. 18, 2014

(54) METHODS AND SYSTEMS FOR DETECTING ANOMALIES WITHIN VOLUMINOUS PRIVATE DATA

(75) Inventors: Nischal M. Piratla, Hyderabad (IN); Chithralekha Balamurugan, Pondicherry (IN); Raja Bala, Pittsford, NY (US); Aaron M. Burry, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 268 days.

(21) Appl. No.: 13/603,451

(22) Filed: Sep. 5, 2012

(65) Prior Publication Data

US 2014/0068777 A1   Mar. 6, 2014

(51) Int. Cl.
G06F 15/16 (2006.01)
(52) U.S. Cl.
USPC ...... 726/26; 726/3; 726/27; 726/34; 713/153; 713/155; 713/189
(58) Field of Classification Search
CPC ...................................... G06F 21/24
See application file for complete search history.

(56) References Cited

U.S. PATENT DOCUMENTS

| | | | | |
|---|---|---|---|---|
| 2004/0088557 | A1* | 5/2004 | Malcolm et al. | 713/193 |
| 2007/0154190 | A1* | 7/2007 | Gilley et al. | 386/125 |
| 2010/0037059 | A1* | 2/2010 | Sun et al. | 713/176 |

OTHER PUBLICATIONS

"Video Anomaly Detection Based on Local Statistical Aggregates"—Saligrama et al, Bostone Univ., Sep. 2010 http://blogs.bu.edu/sry/files/2012/04/cvpr_final.pdf.*
Doan, A., Ramakrishnan, R. and Halevy, A.Y. (2011). Crowdsourcing Systems on the World Wide Web in the Communications of the ACM, vol. 54 No. 4, pp. 86-96.
McCreadie, R.M.C., Macdonald, C., and Ounis, L. (2010). Crowdsourcing a News Query Classification Dataset, in the Proceedings of the Workshop on Crowdsourcing for Search Evaluation, Geneva, Switzerland.
Pujara, J., London, B. and Getoor, L. (2011). Reducing Label Cost by Combining Feature Labels and Crowdsourcing. In Proceedings of the 28$^{th}$ International Conference on Machine Learning, Bellevue, WA, USA, 2011.
Zhao, L., Sukthankar, G. and Sukthankar, R. (2011). Robust Active Learning Using Crowdsourced Annotations for Activity Recognition in the Proceedings of the AAAI Workshop, Aug. 7-11, San Francisco, USA.
Finin, T., Murnane, W., Karandikar, A., Keller, N. and Martineau, J. (2010). Annotating Named Entities in Twitter Data with Crowdsourcing, in the Proceedings of the Workshop on Creating Speech and Language Data With Mechanical Turk at NAACL-HLT.

* cited by examiner

*Primary Examiner* — Randy Scott

(57) ABSTRACT

A method and a system for detecting anomalies within a voluminous private data are provided. The voluminous private data, including sensitive information corresponding to one or more objects within the voluminous private data is received. The sensitive information within the voluminous private data is identified, and identified sensitive information is modified to generate a modified voluminous private data. The sensitive information is marked in the modified voluminous private data to generate a marked voluminous private data. The anomaly within the marked voluminous private data is detected.

25 Claims, 2 Drawing Sheets

METHODS AND SYSTEMS FOR DETECTING ANOMALIES WITHIN VOLUMINOUS PRIVATE DATA

TECHNICAL FIELD

The presently disclosed embodiments are directed to analysis of a voluminous private data. More particularly, the presently disclosed embodiments are directed to a method and system for detecting anomalies in voluminous private data.

BACKGROUND

Video surveillance systems have been used to produce a video record that may be subsequently reviewed to monitor the one or more objects in the video record. Video surveillance systems monitor events, such as, road traffic movement, automobile accidents, business or manufacturing operations, or other similar events. Due to the generation of voluminous video footage of long hours of the event, the analysis of the video data to monitor or identify the anomalies becomes time consuming and expensive.

SUMMARY

According to embodiments illustrated herein, there is provided a method for detecting anomalies in voluminous private data. The method includes various steps for receiving the voluminous private data including one or more data streams, wherein at least one of the data streams includes sensitive information corresponding to one or more objects within the data stream. The sensitive information in the voluminous private data is identified to generate a modified voluminous private data. Thereafter, the sensitive information in the modified voluminous private data is marked to generate a marked voluminous private data. Subsequently, the anomaly is detected within the marked voluminous private data.

According to embodiments illustrated herein, there is provided a method for detecting anomalies in a traffic video data. The method includes various steps for receiving the traffic video data including one or more traffic video data streams, wherein at least one of the traffic video data streams includes sensitive information corresponding to one or more objects within the traffic video data stream. The sensitive information in the traffic video data is identified to generate a modified traffic video data. Thereafter, the sensitive information in the modified traffic video data is marked to generate a marked traffic video data. Subsequently, the anomaly is detected within the marked traffic video data.

According to embodiments illustrated herein, there is provided a system for detecting anomalies in voluminous private data. The system includes a mixing module, a transceiver module, a video processing module, a job creation module, and an extraction module. The mixing module is configured for mixing one or more data streams to form voluminous private data. One of the one or more data streams includes sensitive information corresponding to one or more objects within the data stream. The transceiver module is configured for receiving and transmitting the voluminous private data. The data processing module is configured for identifying the sensitive information in the voluminous private data. The identified sensitive information in the voluminous private data is modified by the data processing module to generate a modified voluminous private data. The job creation module is configured for creating a first task for a first group of remote users for marking the sensitive information in the modified voluminous private data. The extraction module is configured for extracting the marked sensitive voluminous private data from the marked voluminous private data. Lastly the system includes the job creation module which is configured to create a second task for a second group of remote users for identifying the anomalies in the marked sensitive voluminous private data.

According to embodiments illustrated herein, there is provided a computer program product for detecting anomalies within a voluminous private data. The computer program product includes program instruction means for receiving a voluminous private data comprising one or more data streams, wherein one of the data streams includes sensitive information corresponding to one or more objects within the data stream. The computer program product further includes program instruction means for identifying sensitive information in the voluminous private data to generate a modified voluminous private data. The computer program product further includes program instruction means for marking the sensitive information in the modified voluminous private data to generate a marked voluminous private data. The computer program product further includes program instruction means for detecting the anomaly in the marked voluminous private data.

BRIEF DESCRIPTION OF DRAWINGS

The accompanying drawings illustrate various embodiments of systems, methods, and embodiments of various other aspects of the invention. Any person having ordinary skills in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit the scope in any manner, wherein like designations denote similar elements, and in which.

DETAILED DESCRIPTION

Figure 1:
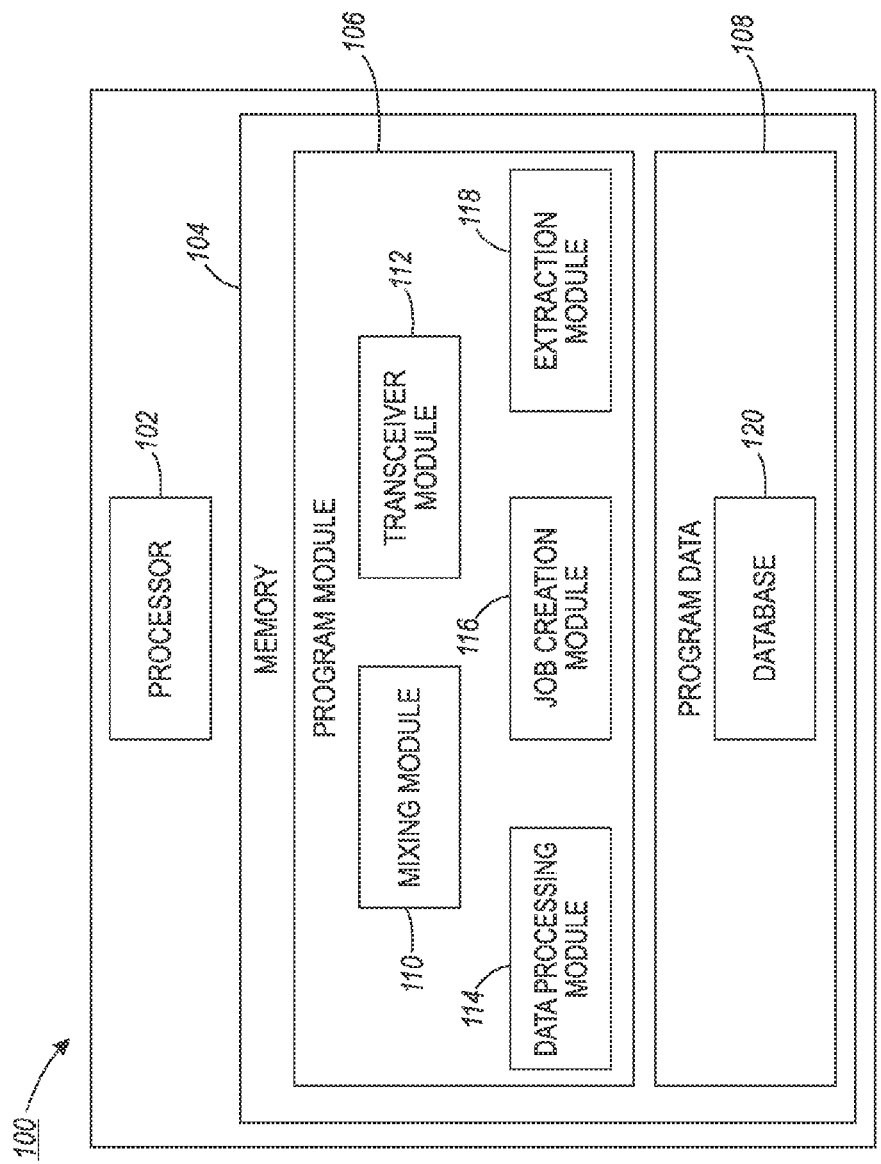
FIG. 1 is a block diagram illustrating an anomaly detection system in accordance with at least one embodiment.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as methods and systems may extend beyond the described embodiments. For example, the teachings presented and the needs of a particular application may yield multiple alternate and suitable approaches to implement functionality of any detail described herein. Therefore, any approach may extend beyond the particular implementation choices in the following embodiments described and shown.

References to "one embodiment", "an embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Definition: The following terms shall have, for the purposes of this application, the respective meanings set forth below.

Data stream: A "Data stream" refers to a collection of moving images of one or more objects captured by a device such as a camera. The data stream may include a road traffic video, a railway traffic video, an airport traffic video, and the like. The road traffic video includes scenes of vehicle movement, the railway traffic video includes scenes of train and passenger movement, and the airport traffic video including scenes of airplane and passenger movement.

Voluminous private data: "Voluminous private data" refers to a mixture of two or more data streams.

Remote user: "Remote user" refers to a person who belongs to a pool of users who will perform a job/task. The remote user is located at a remote location from a database and can access the database through the use of a network such as LAN, WAN, and MAN. In an embodiment, the remote user is referred to as a crowd worker who may perform one or more tasks that generate data contributing to a result. Each crowd worker is further compensated for contribution to the task, or participation in the task may be rewarded with intangibles such as personal satisfaction or gaining valuable experience.

Job/Task: "Job" or a "Task" refers to the work/assignment given to a remote user. The task is then directly uploaded on to a crowd sourcing platform (for example, Amazon's Mechanical Turk) from where it can be accessed by remote users/crowd workers.

Anomaly: "Anomaly" refers to a situation differing significantly from the normal predefined flow, order, or rule. In an embodiment, for example, an anomaly refers to the violation of various predefined traffic regulations by vehicles.

Sensitive information: "Sensitive information" refers to information that includes personal information/details corresponding to one or more objects within the voluminous private data. In an embodiment, the sensitive information includes one or more of a human face, a vehicle license plate, and the like.

The present disclosure along with the detailed figures and description set forth herein describes a method and a system for detecting anomalies related to one or more objects within a voluminous private data by two or more remote users. In an embodiment, a recorder (e.g., video recorder) is installed at different locations (e.g., roads) for recording activity of one or more objects (e.g., vehicles) at a particular physical location. The recorder records the vehicular traffic video, which is subsequently reviewed by two or more remote users to monitor and detect the anomalies (e.g., traffic rule violations) by one or more objects present in the traffic voluminous private data. A detailed description of the disclosure will now be provided in conjunction with the explanation for the drawings.

FIG. 1 is a block diagram illustrating an anomaly detection system 100 in accordance with at least one embodiment. In an embodiment, anomaly detection system 100 corresponds to a computing device such as a Personal Digital Assistant (PDA), a smartphone, a tablet PC, a laptop, a personal computer, a mobile phone, a Digital Living Network Alliance (DLNA)-enabled device, or the like.

The anomaly detection system 100 includes a processor 102 and a memory 104. The processor 102 is coupled with the memory 104. The processor 102 is configured to fetch the set of instructions and thereafter execute the set of instructions stored in the memory 104. In an embodiment, the processor 102 can be realized through a number of processor technologies known in the art. Examples of the processor can be an X86 processor, a RISC processor, an ASIC processor, a CSIC processor, or any other processor.

The memory 104 is configured to store the set of instructions or modules. Some of the commonly known memory implementations can be, but are not limited to, a Random Access Memory (RAM), a Read-Only Memory (ROM), a Hard Disk Drive (HDD), and a secure digital (SD) card. In an embodiment, the memory 104 includes a program module 106 and a program data 108. Program module 106 includes a set of instructions that can be executed by the processor 102 to perform specific actions on the anomaly detection system 100. Program module 106 includes a mixing module 110, a transceiver module 112, a data processing module 114, a job creation module 116, and an extraction module 118. The program data 108 includes a database 120.

The mixing module 110 is configured for mixing one or more data streams to form a voluminous private data. In an embodiment, mixing module 110 mixes a first data stream and a second data stream to form a voluminous private data. In an embodiment, the first data stream is a real traffic video and the second data stream is a movie video. The real traffic video and the movie video are taken as examples of the first and the second data streams respectively, and in another embodiment of the present disclosure, any non-video data or audio data can be considered as the first data stream and the second data stream. In an embodiment, the movie video includes scenes of traffic movement. According to the present disclosure, the real traffic video includes sensitive information corresponding to one or more objects (e.g., humans, vehicles, etc) present within the real traffic video. The sensitive information includes one or more of a human face, the license plate of a vehicle, or the like within the real traffic video.

The mixing module 110 is further configured to break data streams into a set of video snippets. In an embodiment, the mixing module 110 implements various computer programs to break data streams into a set of video snippets. Further, the mixing module 110 combines the set of video snippets into a voluminous private data. In an embodiment, mixing module 110 implements various computer programs to combine the set of video snippets into a voluminous private data. In an embodiment, the video breaking computer program and the video combining computer program are so chosen that there is no impact on the quality of the video while breaking a larger video file into smaller snippets or while combining the smaller snippets into a larger video file.

In an embodiment, the real traffic video and the movie video is broken into a set of real traffic video snippets and a set of the movie video snippets respectively by using a suitable video breaking computer program known in the art. Thereafter, the set of real traffic video snippets and set of movie traffic video snippets are mixed/combined with each other to generate the voluminous private data such that the snippets of the real traffic video and the movie video are distributed and/or mixed in a random order in the voluminous private data. It will be understood and appreciated by a person having ordinary skill in the art that the movie video will be so chosen that upon mixing it with the real traffic video, the combined voluminous private data will appear as one continuous video file.

The anomaly detection system 100 further includes transceiver module 112. The transceiver module 112 is configured to establish and maintain communication with the mixing module 110. The transceiver module 112 receives the voluminous private data from the mixing module 110, and transmits the video to the data processing module 114.

In an embodiment, the transceiver module 112 is configured to directly receive the voluminous private data from the mixing module 110 and transmit the voluminous private data to the data processing module 114, wherein the voluminous private data received from the mixing module 110 includes the mixture of traffic video and movie video. In another embodiment, the transceiver module 112 is configured to directly receive the voluminous private data from the recorder (recording the vehicular traffic movement at a particular physical location) and to directly transmit voluminous private data corresponding to real traffic video to the data processing module 114, wherein the voluminous private data received from the recorder includes vehicular traffic video. In an embodiment, the transceiver module 112 facilitates the receipt and transmission of voluminous private data from the other modules through an antenna, an Ethernet port, an HDMI port, a VGA port, a USB port or any port. The transceiver module 112 transmits and receives the voluminous private data in accordance with various communication protocols such as Transmission Control Protocol and Internet Protocol (TCP/IP), User Datagram Protocol (UDP), 2G, 3G, and 4G.

The data processing module 114 receives voluminous private data from the transceiver module 112 and is configured to identify and thereafter modify the sensitive information corresponding to one or more objects within the voluminous private data. In an embodiment, the data processing module 114 processes the voluminous private data through image processing means. It will be understood and appreciated by a person having ordinary skill in the art that any known image processing technique can be used for processing the voluminous private data without departing from the scope of the disclosed embodiments. In an embodiment, the image processing technique of the data processing module 114 is designed and configured to identify the location of the sensitive information corresponding to one or more objects within the voluminous private data and thereafter modifying the sensitive information corresponding to one or more objects within the voluminous private data.

The identification of the sensitive information is based on various rules defined by an administrator of the anomaly detection system 100 on the basis of a first predefined criteria. It will be understood and appreciated by a person having ordinary skill in the art that the above-stated rules may vary depending on the actual voluminous private data being analyzed. For example, in an embodiment, sensitive information in a traffic voluminous private data will be different from sensitive information in a video footage of tourist movement in a national heritage site. In an embodiment, the first predefined criteria is variable depending on the rules applied for choosing the sensitive information. According to the present disclosure, the sensitive information corresponding to one or more objects identified by the image processing means in the voluminous private data includes human faces (of drivers), license plates of the vehicle, etc.

The image processing technique is further configured to modify the identified sensitive information corresponding to one or more objects within the voluminous private data by blurring the sensitive information in the voluminous private data to generate a modified voluminous private data. The blurring is performed in order to distort the sensitive information while still being able to detect the location of sensitive information within the modified voluminous private data. In another embodiment, the sensitive information corresponding to one or more objects within the voluminous private data is modified by downsizing the voluminous private data to generate a modified voluminous private data. The downsizing of the voluminous private data is performed in a way such that the sensitive information is not clearly visible while still being able to detect the location of sensitive information within the modified voluminous private data. In yet another embodiment, the sensitive information corresponding to one or more objects within the voluminous private data is modified by substituting the identified sensitive information with trivial information in the voluminous private data to generate a modified voluminous private data. Thus, the data processing module 114 processes the voluminous private data to generate a modified voluminous private data in which the sensitive information related to one or more objects is either distorted, blurred, downsized, or the like.

The job creation module 116 is configured for creating and publishing a first task for a first group of remote users, and for creating and publishing a second task for a second group of remote users, in the crowd sourcing platform. In an embodiment, the remote users refer to crowd workers. The job creation module 116 creates and publishes the first task of marking the sensitive information in the modified voluminous private data generated by the data processing module 114. The first task is then directly uploaded on the crowd sourcing platform from where the first task can be accessed by the first group of remote users. In an embodiment, Amazon's Mechanical Turk is used for uploading the first and second tasks respectively. In another embodiment, CrowdFlower is used for uploading the first and second tasks respectively.

In an embodiment, the job creation module 116 provides the information regarding the first task including the details and time period to complete the first task to the first group of remote users. The details of the first task include but are not limited to provide instructions to analyze the modified voluminous private data transmitted by the data processing module 112. The analysis is to be done for identifying the sensitive information related to one or more objects within the modified voluminous private data and thereafter marking the location of the sensitive information within the modified voluminous private data by any suitable pointing/marking mechanism to generate a marked voluminous private data. In an embodiment, any suitable pointing/marking mechanism (for example, computer mouse) known in the art can be used to mark the location of identified sensitive information in the modified voluminous private data by the first group of remote users. In an embodiment, the time to complete the task of identifying and marking the sensitive information in the modified voluminous private data is specified in the task itself.

Further, the first task is provided to the first group of remote users as a game in which each of the users has to identify/locate the sensitive information within the modified voluminous private data and thereafter mark the sensitive information within the modified voluminous private data. The incentive/reward of the game is proportional to the amount of marking of the sensitive information within the modified voluminous private data by the user. Thus, this first task provided as the game helps to ensure the diversion of attention of the first group of remote users to maximize the incentive rather than paying attention to the content of the modified voluminous private data.

The job creation module 116 of the anomaly detection system 100 is further configured to create and publish the second task for the second group of remote users. According to the present disclosure, none of the first group of remote users will be working on the second task provided to the second group of remote users and vice versa. The second task created by the job creation module 116 is to identify the anomaly related to one or more objects within the marked voluminous private data generated by the first group of remote users.

The identification of the anomaly is based on the rules defined by an administrator of the anomaly detection system 100 on the basis of a second predefined criteria. It will be understood by a person having ordinary skill in the art that the above-stated rules may vary depending on the actual voluminous private data being analyzed. For example, in an embodiment, anomaly related to one or more objects in a traffic voluminous private data will be different from anomaly related to one or more objects in a video footage of tourist movement in a national heritage site. In an embodiment, the second predefined criteria is variable depending on the rules applied for determining the anomalies. In an embodiment, the second predefined criteria is a set of traffic violations, for example, jumping red lights, driving against the traffic on a one-way street, talking on the mobile phone while driving, etc. It will be understood by a person having ordinary skill in the art that the second predefined criteria is a variable list and may vary depending on the specific traffic rules of a city or state.

The job creation module 116 provides the information regarding the second task including the details and time period to complete the second task to the second group of remote users. In an embodiment, the second group of remote users identifies the anomalies in the marked voluminous private data related to one or more objects on the basis of a second set of criteria. In an embodiment, the second task created and published by the job creation module 116 on the crowd sourcing platform specifies the second predefined criteria in the second task. The second group of remote users is tasked to identify objects in the marked voluminous private data which match with one or more attributes specified in the second predefined criteria.

Thus, the job creation module 116 receives the voluminous private data from the transceiver module 112 or the modified voluminous private data from the data processing module 114. Thereafter the job creation module 116 creates and publishes the first job and the second job for the first set of remote users and the second set of remote users respectively to identify/locate and mark the sensitive information within the voluminous private data/the modified voluminous private data and subsequently detect the anomalies related to one or more objects within the marked voluminous private data. It will be understood and appreciated by a person having ordinary skill in the art that the disclosed embodiments enable identification of anomalies while protecting the sensitive information corresponding to one or more objects within the voluminous private data from the remote users.

The extraction module 118 is configured for extracting the first data stream or the second data stream from the marked voluminous private data generated by the first set of remote users or from the marked voluminous private data in which the anomalies are detected by the second set of remote users by any suitable computer program known in the art (For example Microsoft Movie Maker). In order to extract the first data stream or the second data stream from the marked voluminous private data, the marked voluminous private data is broken into a set of marked video snippets. The set of marked video snippets include the first set of marked video snippets and the second set of marked video snippets wherein the first set of marked video snippets and the second set of marked video snippets are separated from each other, and as per the requirement of the administrator of the anomaly detection system 100, the desired first/second set of marked video snippets can be extracted from the complete set of marked video snippets. In an embodiment, the first set of marked video snippets includes traffic video/snippets in which the sensitive information is marked and the second set of the marked video snippets include movie video/snippets in which the sensitive information is marked respectively.

According to the present disclosure, in an embodiment, the marked voluminous private data obtained from the first group of remote users is sent to the extraction module 118 to extract the marked sensitive voluminous private data. In an embodiment, the marked sensitive voluminous private data includes the traffic video/snippets in which the sensitive information is identified/located and thereafter marked by the first group of remote users. Thus, the marked sensitive voluminous private data in which the sensitive information is marked is obtained by discarding the set of second data stream/snippets (movie video) that does not include the sensitive information related to one or more objects within the marked voluminous private data. In an alternate embodiment, the marked voluminous private data in which the sensitive information is identified/located and thereafter marked by the first group of remote users is sent to the second group of remote users to detect the anomalies corresponding to one or more objects within the marked voluminous private data, and thereafter the marked voluminous private data along with associated anomalies related to one or more objects within the marked voluminous private data provided by the second group of remote users is sent to the extraction module 118 to extract either marked sensitive voluminous private data or marked non-sensitive voluminous private data with its associated anomalies wherein the marked sensitive voluminous private data includes the real traffic video and the marked non-sensitive voluminous private data includes the movie video.

Lastly, the anomaly detection system 100 includes the database 120. The database 120 stores various videos of one or more categories, the detected anomalies, etc. For example, the database can be configured to store voluminous private data that need to be analyzed to identify the anomalies present within the voluminous private data corresponding to one or more objects in the voluminous private data. The database can be implemented by using several technologies that are well known to those skilled in the art. Some examples of the technologies may include, but are not limited to, MySQL®, Microsoft SQL®, etc. In an embodiment, the database may be implemented as cloud storage. Examples of cloud storage may include, but are not limited to, Amazon E3®, Hadoop® distributed file system, etc.

Figure 2:
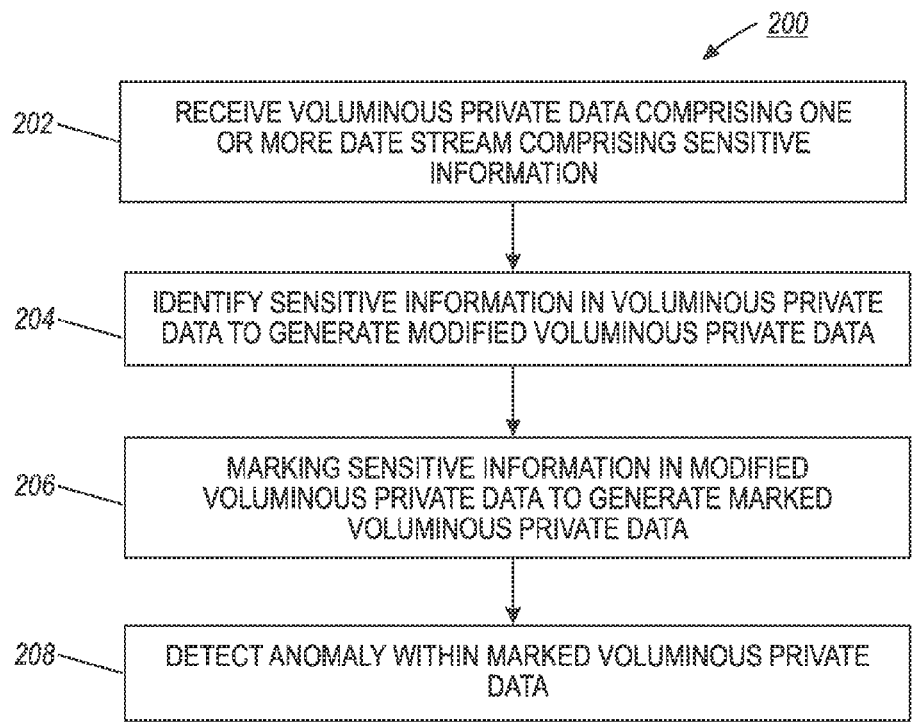
FIG. 2 is a flow diagram illustrating a method for detecting anomaly in a voluminous private data in accordance with at least one embodiment.

FIG. 2 is a flow diagram illustrating a method for detecting anomaly in a voluminous private data in accordance with at least one embodiment. FIG. 2 is explained in conjunction with FIG. 1.

At step 202, the voluminous private data including one or more data streams comprising sensitive information is received. In an embodiment, the voluminous private data is received by the transceiver module 112. In an embodiment, the voluminous private data includes the combination of the first data stream and a second data stream. Each of the first data stream and the second data stream is broken into a first set of video snippets and a second set of video snippets respectively. In an embodiment, the breaking of data streams in performed in the mixing module 110. Thereafter, the first set of video snippets and the second set of video snippets are combined together in a random arrangement to form the voluminous private data that is needed to be analyzed for detecting the anomalies related to one or more objects present within the voluminous private data. In an embodiment, the combining of video snippets in done in the mixing module 110.

In an embodiment, one or more objects are present in the first data stream/the first set of video snippets. Each of the objects includes sensitive information. In an alternate embodiment, one or more objects are present in the first data stream/the first set of video snippets, and the second data stream/the second set of video snippets, and wherein each of the objects in the first data stream/snippet and the second data stream/snippet includes sensitive information. In an embodiment, the first data stream includes a traffic video which needs to be analyzed to detect any anomaly associated with one or more objects present within it, and the second data stream includes a movie video depicting traffic scene. In yet another embodiment, the voluminous private data may include only one data stream. In yet another embodiment, the voluminous private data may include three or more data streams.

At step 204, sensitive information in voluminous private data is identified to generate modified voluminous private data in accordance with the first set of criteria. The voluminous private data is processed to identify the sensitive information corresponding to one or more objects present within the voluminous private data. In an embodiment the voluminous private data is processed by data processing module 114. The identification of the sensitive information is performed by any suitable image processing technique of the data processing module 114, based on the rules defined by an administrator of the anomaly detection system 100 on the basis of the first set of criteria.

The identified sensitive information in the voluminous private data is thereafter modified to generate a modified voluminous private data. In an embodiment, the data processing module 114 modifies the identified sensitive information present in the voluminous private data by any suitable image processing technique known in the art. In an embodiment, the sensitive information is modified by blurring the sensitive information in the voluminous private data to generate a modified voluminous private data. In an alternate embodiment, the sensitive information is modified by downsizing the sensitive information present in the voluminous private data to generate a modified voluminous private data. In yet another embodiment, the sensitive information is modified by substituting the sensitive information present in the voluminous private data with trivial information to generate a modified voluminous private data.

At step 206, the sensitive information is marked in modified voluminous private data to generate a modified voluminous private data. In an embodiment, a first task is created by the job creation module 116 for the first group of remote users to identify/locate and mark the sensitive information corresponding to one or more objects present within the modified voluminous private data to generate a marked voluminous private data. In order to perform the first task, the modified voluminous private data is streamed to each user of the first group of remote users one at a time. Each user identifies/locates the sensitive information in the modified voluminous private data by processing the modified voluminous private data by any suitable processing means known in the art. Once the user identifies the sensitive information, the user marks the sensitive information in the modified voluminous private data by any suitable pointing/marking mechanism known in the art, for example, a computer mouse or the like to generate the marked voluminous private data. Thereafter the results (identified and marked sensitive information in the modified voluminous private data) provided by each user will be compared to determine the valid marked sensitive information in the modified voluminous private data. In an embodiment, for each object of the modified voluminous private data, the associated marked sensitive information is considered valid when the maximum numbers of users have provided the same results. In an alternate embodiment, each user provides their marked sensitive information corresponding to one or more objects within the modified voluminous private data, and the valid, sensitive information is determined by taking a union of the results (marked sensitive information) related to one or more objects in the modified voluminous private data provided by each user.

Thereafter in the present embodiment the marked voluminous private data is filtered to extract the marked sensitive voluminous private data. The filtering of the voluminous private data is done by any known suitable software known in the art such as Microsoft Moviemaker. The marked sensitive voluminous private data includes the first data stream in which the sensitive information (either blurred or downsized or substituted with trivial information) corresponding to one or more objects is identified and marked by the first group of remote users according to an embodiment of the present disclosure.

In step 208, the anomaly is detected within the marked voluminous private data in accordance with a second set of criteria. In an embodiment, a second task is created by the job creation module 116 for the second group of remote users to detect the anomaly within the marked voluminous private data in accordance with a second set of criteria. Therefore, the second group of remote users is provided with the marked voluminous private data and a set of predefined rules to determine the anomalies present in the marked voluminous private data based on the set of predefined rules. For example, if the marked voluminous private data provided to the second group of remote users comprises traffic voluminous private data, then the second task provided to the second group of remote users may include identifying vehicles in the traffic voluminous private data that violate predefined traffic rules, wherein the set of predefined rules may relate to determining the vehicles in the traffic voluminous private data exceeding the specified speed limit to jumping red lights or stop signs. Once the user identifies all the anomalies related to one or more objects within the marked voluminous private data, the marked voluminous private data is again broken into a first data stream and a second data stream by using any known suitable software, in which the first data stream and the associated anomalies related to one or more objects of the first data stream are set aside and stored whereas the second data stream is discarded. In an alternate embodiment, the second group of remote users may be provided with the marked sensitive voluminous private data to determine the anomalies related to one or more objects within the marked sensitive voluminous private data based on a second set of criteria which includes a set of predefined rules.

The present disclosure proposes a method for detecting anomalies within a voluminous private data using two or more remote group of users. The method uses a two-step procedure to detect anomalies in the voluminous private data without compromising on the sensitive information security of the one or more objects within the voluminous private data. In the two-step procedure, the first step involves the marking of the sensitive information corresponding to one or more objects within the voluminous private data by a first group of remote users. In the second step the anomalies are detected in the marked voluminous private data by a second group of remote users. A user can use this method and system to detect anomalies in the voluminous private data and create a database of the voluminous private data with associated different anomalies in order to train the anomaly detection algorithms. The database of the voluminous private data and associated anomalies further serve as a data source for testing a newly-developed anomaly detection system. The disclosed embodiments are especially beneficial in the transportation sector to detect the anomalies in the traffic voluminous private data, however the method and system proposed in the present disclosure can be used in other domains such as Casinos security systems as well.

Figure 3:
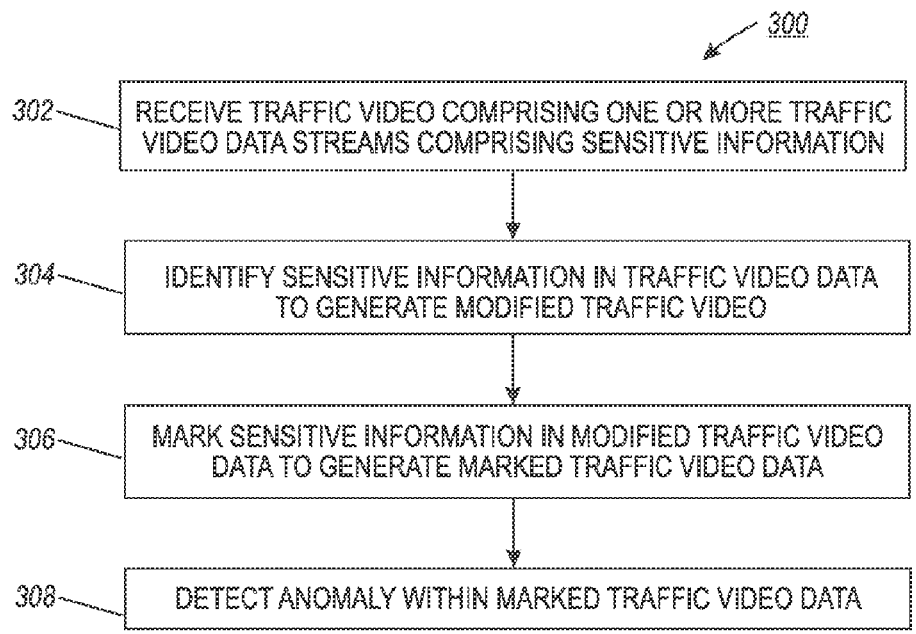
FIG. 3 is a flow diagram illustrating a method for detecting anomaly in a traffic video data in accordance with at least one embodiment.

FIG. 3 is a flow diagram illustrating a method for detecting anomaly in a traffic video data in accordance with at least one embodiment. FIG. 3 is explained in conjunction with FIG. 1.

At step 302, the traffic video data including one or more traffic video data streams comprising sensitive information is received. In an embodiment, the traffic video data is received by the transceiver module 112. The traffic video data includes the combination of the first data stream and a second data stream. Each of the first data stream and the second data stream is broken into a first set of video snippets and a second set of video snippets respectively. In an embodiment, the breaking of data streams in performed in the mixing module 110. Thereafter, the first set of video snippets and the second set of video snippets are combined together in a random arrangement to form the traffic video data that is needed to be analyzed for detecting the anomalies related to one or more objects present within the traffic video data. In an embodiment, the combining of video snippets in done in the mixing module 110.

In an embodiment, one or more objects are present in the first data stream/the first set of video snippets. Each of the objects includes sensitive information. In an alternate embodiment, one or more objects are present in the first data stream/the first set of video snippets, and the second data stream/the second set of video snippets, and wherein each of the objects in the first data stream/snippet and the second data stream/snippet includes sensitive information. In an embodiment, the first data stream includes a traffic video which needs to be analyzed to detect any anomaly associated with one or more objects present within it, and the second data stream includes a movie video depicting traffic scene. In yet another embodiment, the traffic video data may include only one data stream. In yet another embodiment, the traffic video data may include three or more data streams.

At step 304, sensitive information in traffic video data is identified to generate modified traffic video data in accordance with the first set of criteria. The traffic video data is processed to identify the sensitive information corresponding to one or more objects present within the traffic video data. In an embodiment the traffic video data is processed by data processing module 114. The identification of the sensitive information is performed by any suitable image processing technique of the data processing module 114, based on the rules defined by an administrator of the anomaly detection system 100 on the basis of the first set of criteria. In an embodiment, the sensitive information includes at least one of a driver face, a pedestrian face, or characters on a license plate of a vehicle.

The identified sensitive information in the traffic video data is thereafter modified to generate a modified traffic video data. In an embodiment, the data processing module 114 modifies the identified sensitive information present in the traffic video data by any suitable image processing technique known in the art. In an embodiment, the sensitive information is modified by blurring the sensitive information in the traffic video data to generate a modified traffic video data. In an alternate embodiment, the sensitive information is modified by downsizing the sensitive information present in the traffic video data to generate a modified traffic video data. In yet another embodiment, the sensitive information is modified by substituting the sensitive information present in the traffic video data with trivial information to generate a modified traffic video data.

At step 306, the sensitive information is marked in modified traffic video data to generate a modified traffic video data. In an embodiment, a first task is created by the job creation module 116 for the first group of remote users to identify/locate and mark the sensitive information corresponding to one or more objects present within the modified traffic video data to generate a marked traffic video data. In order to perform the first task, the modified traffic video data is streamed to each user of the first group of remote users one at a time. Each user identifies/locates the sensitive information in the modified traffic video data by processing the modified traffic video data by any suitable processing means known in the art. Once the user identifies the sensitive information, the user marks the sensitive information in the modified traffic video data by any suitable pointing/marking mechanism known in the art, for example, a computer mouse or the like to generate the marked traffic video data. Thereafter the results (identified and marked sensitive information in the modified traffic video data) provided by each user will be compared to determine the valid marked sensitive information in the modified traffic video data. In an embodiment, for each object of the modified traffic video data, the associated marked sensitive information is considered valid when the maximum numbers of users have provided the same results. In an alternate embodiment, each user provides their marked sensitive information corresponding to one or more objects within the modified traffic video data, and the valid, sensitive information is determined by taking a union of the results (marked sensitive information) related to one or more objects in the modified traffic video data provided by each user.

Thereafter in the present embodiment the marked traffic video data is filtered to extract the marked sensitive traffic video data. The filtering of the traffic video data is done by any known suitable software known in the art such as Microsoft Moviemaker. The marked sensitive traffic video data includes the first data stream in which the sensitive information (either blurred or downsized or substituted with trivial information) corresponding to one or more objects is identified and marked by the first group of remote users according to an embodiment of the present disclosure.

In step 308, the anomaly is detected within the marked traffic video data in accordance with a second set of criteria. In an embodiment, a second task is created by the job creation module 116 for the second group of remote users to detect the anomaly within the marked traffic video data in accordance with a second set of criteria. Therefore, the second group of remote users is provided with the marked traffic video data and a set of predefined rules to determine the anomalies present in the marked traffic video data based on the set of predefined rules. For example, if the marked traffic video data provided to the second group of remote users comprises traffic video data, then the second task provided to the second group of remote users may include identifying vehicles in the traffic video data that violate predefined traffic rules, wherein the set of predefined rules may relate to determining the vehicles in the traffic video data exceeding the specified speed limit to jumping red lights or stop signs. Once the user identifies all the anomalies related to one or more objects within the marked traffic video data, the marked traffic video data is again broken into a first data stream and a second data stream by using any known suitable software, in which the first data stream and the associated anomalies related to one or more objects of the first data stream are set aside and stored whereas the second data stream is discarded. In an alternate embodiment, the second group of remote users may be provided with the marked sensitive traffic video data to determine the anomalies related to one or more objects within the marked sensitive traffic video data based on a second set of criteria which includes a set of predefined rules.

The disclosed methods and systems, as illustrated in the ongoing description or any of its components, may be embodied in the form of a computer system. Typical examples of a computer system include a general-purpose computer, a programmed microprocessor, a microcontroller, a peripheral integrated circuit element, and other devices, or arrangements of devices that are capable of implementing the steps that constitute the method of the disclosure.

The computer system comprises a computer, an input device, a display unit, and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as a floppy-disk drive, optical-disk drive, etc. The storage device may also be a means for loading computer programs or other instructions into the computer system. The computer system also includes a communication unit. The communication unit allows the computer to connect to other databases and the Internet through an Input/output (I/O) interface, allowing the transfer as well as reception of data from other databases. The communication unit may include a modem, an Ethernet card, or other similar devices, which enable the computer system to connect to databases and networks, such as, LAN, MAN, WAN, and the Internet. The computer system facilitates inputs from a user through the input device, accessible to the system through an I/O interface.

The computer system executes a set of instructions that are stored in one or more storage elements, in order to process input data. The storage elements may also hold data or other information, as desired. The storage element may be in the form of an information source or a physical memory element present in the processing machine.

The programmable or computer-readable instructions may include various commands that instruct the processing machine to perform specific tasks such as steps that constitute the method of the disclosure. The method and systems described can also be implemented using only software programming or hardware or by a varying combination of the two techniques. The disclosure is independent of the programming language and the operating system used in computers. The instructions for the disclosure can be written in all programming languages including, but not limited to, 'C', 'C++', 'Visual C++', and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, results of previous processing, or a request made by another processing machine. The disclosure can also be implemented in all operating systems and platforms including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

The method, system, and computer program product, as described above have numerous advantages. Some of these advantages may include, but are not limited to, reducing costs, increasing returns on investments, improving process performance, freeing up resources for other uses, converting fixed costs to variable costs, and improving speed to market.

Various embodiments of the method and system for detecting anomaly within the voluminous private data have been disclosed. However, it should be apparent to those skilled in the art that many more modifications, besides those described, are possible without departing from the inventive concepts herein. The embodiments, therefore, are not to be restricted, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skill in the art will appreciate that the system, modules, and sub-modules have been illustrated and explained to serve as examples and should not be considered limiting in any manner. It will be further appreciated that the variants of the above-disclosed system elements, or modules and other features and functions, or alternatives thereof, may be combined to create many other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and are not limited to any particular computer hardware, software, middleware, firmware, microcode, etc.

The claims can encompass embodiments for hardware, software, or a combination thereof.

It will be appreciated that variants of the above disclosed, and other features and functions or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A computer implemented method for detecting an anomaly within a voluminous private data, the computer implemented method comprising:

receiving the voluminous private data comprising one or more voluminous private data streams, wherein at least one voluminous private data stream comprises sensitive information corresponding to one or more objects within the voluminous private data stream;

identifying the sensitive information in the voluminous private data;

masking the identified sensitive information to generate modified voluminous private data;

receiving a first input, from a first set of remote workers, corresponding to marking of the sensitive information in the modified voluminous private data to generate a marked voluminous private data; and receiving a second input, from a second set of remote workers, corresponding to detection of the anomaly within the marked voluminous private data.

2. The computer implemented method of claim 1, wherein the identifying comprises modifying the sensitive information in the voluminous private data.

3. The computer implemented method of claim 1 further comprising filtering out the marked sensitive information from the marked voluminous private data.

4. The computer implemented method of claim 1 further comprising storing the detected anomaly in a database.

5. The computer implemented method of claim 1 wherein the voluminous private data comprises a first data stream and a second data stream.

6. The computer implemented method of claim 5 further comprising breaking the first data stream into a first set of video snippets, and the second data stream into a second set of video snippets respectively.

7. The computer implemented method of claim 6 further comprising combining the first set of video snippets and the second set of video snippets in a random arrangement to generate the voluminous private data.

8. The computer implemented method of claim 5, wherein the first data stream comprises the sensitive information corresponding to one or more objects.

9. The computer implemented method of claim 1, wherein masking the identified sensitive information comprises one or more of blurring the voluminous private data, downsizing the voluminous private data, and substituting the sensitive information with trivial information in the voluminous private data.

10. The computer implemented method of claim 1, wherein the voluminous private data comprises at least one of a video data or an audio data.

11. The computer implemented method of claim 1 further comprising creating a first task comprising the modified voluminous private data, wherein the first task is transmitted to the first set of remote workers.

12. The computer implemented method of claim 1 further comprising creating a second task for the second set of remote workers, wherein the second task comprises the marked voluminous private data.

13. A system for detecting an anomaly within a voluminous private data, the system comprises:
one or more processors configured to:
mix one or more data streams to form a voluminous private data, wherein at least one data stream comprises sensitive information corresponding to one or more objects within the data stream;
identify the sensitive information in the voluminous private data, wherein the identified sensitive information in the voluminous private data is masked to generate a modified voluminous private data;
create a first task for a first set of remote workers;
receive a first input, from the first set of remote workers, corresponding to marking of the sensitive information in the modified voluminous private data to generate a marked voluminous private data;

extract the marked sensitive voluminous private data from the marked voluminous private data, wherein a second task is created for a second set of remote workers; and receive a second input, from the second set of remote workers, corresponding to detection of the anomaly within the marked voluminous private data.

14. The system of claim 13, wherein the one or more processors are further configured to separate the one or more data streams from the marked voluminous private data.

15. The system of claim 13, further comprising a database for storing the detected anomaly.

16. A computer implemented method for detecting an anomaly within a traffic video data, the computer implemented method comprising:
receiving the traffic video data comprising one or more traffic video data streams, wherein at least one traffic video data stream comprises sensitive information corresponding to one or more objects within the traffic video data stream;
identifying the sensitive information in the traffic video data;
masking the identified sensitive information to generate modified traffic video data;
receiving a first input, from a first set of remote workers, corresponding to marking the sensitive information in the modified traffic video data to generate a marked traffic video data; and
receiving a second input, from a second set of remote workers, corresponding to detection of the anomaly within the marked traffic video data.

17. The computer implemented method of claim 16, wherein the identifying comprises modifying the sensitive information in the traffic video data.

18. The computer implemented method of claim 16 further comprising filtering out the marked sensitive information from the marked traffic video data.

19. The computer implemented method of claim 16, wherein the sensitive information comprises at least one of a driver's face, a pedestrian's face, or characters on a license plate of a vehicle.

20. The computer implemented method of claim 16 further comprising storing the detected anomaly in a database.

21. The computer implemented method of claim 16, wherein the traffic video data comprises a first data stream and a second data stream.

22. The computer implemented method of claim 21 further comprising breaking the first data stream into a first set of video snippets, and the second data stream into a second set of video snippets respectively.

23. The computer implemented method of claim 22 further comprising combining the first set of video snippets and the second set of video snippets in a random arrangement to generate the traffic video data.

24. The computer implemented method of claim 21, wherein the first data stream comprises the sensitive information corresponding to one or more objects.

25. The computer implemented method of claim 17, wherein masking the identified sensitive information comprises one or more of blurring the traffic video data, downsizing the traffic video data, and substituting the sensitive information with trivial information in the traffic video data.

* * * * *